United States Patent
Mehr et al.

(10) Patent No.: US 12,535,171 B2
(45) Date of Patent: Jan. 27, 2026

(54) SEALING OF CERAMIC TO METALLIC TUBES WITH DIFFERENT CTE FOR HIGH TEMPERATURE REACTORS

(71) Applicant: Honeywell International Inc., Charlotte, NC (US)

(72) Inventors: Mehrad Mehr, Morristown, NJ (US); Robert Mantz, Clifton, NJ (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 179 days.

(21) Appl. No.: 17/933,392

(22) Filed: Sep. 19, 2022

(65) Prior Publication Data

US 2024/0093821 A1 Mar. 21, 2024

(51) Int. Cl.
| | |
|---|---|
| *F16L 25/00* | (2006.01) |
| *F16L 49/00* | (2006.01) |
| *F16L 49/02* | (2006.01) |
| *F16L 51/00* | (2006.01) |

(52) U.S. Cl.
CPC ........... *F16L 51/00* (2013.01); *F16L 25/0072* (2013.01); *F16L 49/00* (2013.01); *F16L 49/02* (2013.01)

(58) Field of Classification Search
CPC ....... F16L 9/10; F16L 13/007; F16L 25/0072; F16L 49/02
See application file for complete search history.

(56) References Cited

U.S. PATENT DOCUMENTS

| | | | |
|---|---|---|---|
| 3,270,780 A | * | 9/1966 | Kydd ...................... F16L 9/14 165/81 |
| 4,135,936 A | | 1/1979 | Ballard, Jr. |
| 5,613,794 A | * | 3/1997 | Isaac .................. B29C 66/1222 280/281.1 |
| 5,725,218 A | | 3/1998 | Maiya et al. |
| 6,402,156 B1 | | 6/2002 | Schutz et al. |
| 7,378,361 B2 | | 5/2008 | Pinckney et al. |

(Continued)

FOREIGN PATENT DOCUMENTS

| | | |
|---|---|---|
| EP | 1783107 A1 | 5/2007 |
| EP | 1788293 A2 | 5/2007 |

(Continued)

OTHER PUBLICATIONS

The Engineering ToolBox, "https://web.archive.org/web/20200426231939/https://www.engineeringtoolbox.com/linear-expansion-coefficients-d_95.html" (Year: 2020).*

(Continued)

*Primary Examiner* — Zachary T Dragicevich
*Assistant Examiner* — Alexander T Rufrano
(74) *Attorney, Agent, or Firm* — Shumaker & Sieffert, P.A.

(57) ABSTRACT

An assembly includes a first tube. The first tube includes a first end configured to receive a second tube. The second tube includes a first end configured to slidably translate into the first end of the first tube and to receive an insert. The insert is configured to be disposed within a first portion of the second tube that is near the first end of the second tube. The first tube, the second tube, and the insert form a seal. The coefficient of thermal expansion (CTE) of the first tube is similar to the CTE of the insert and different from the CTE of the second tube.

16 Claims, 7 Drawing Sheets

(56) References Cited

U.S. PATENT DOCUMENTS

| | | | | |
|---|---|---|---|---|
| 8,118,331 | B2 * | 2/2012 | Yamashita | F16L 47/24 |
| | | | | 29/523 |
| 8,876,425 | B2 * | 11/2014 | Wilson | C23F 13/06 |
| | | | | 403/267 |
| 9,133,966 | B2 * | 9/2015 | His | F28F 9/26 |
| 10,059,625 | B2 | 8/2018 | Dai et al. | |
| 2008/0304959 | A1 | 12/2008 | Benoit et al. | |
| 2018/0065212 | A1 * | 3/2018 | Mako, Jr. | C04B 37/005 |
| 2018/0134629 | A1 | 5/2018 | Kolios et al. | |
| 2019/0002337 | A1 | 1/2019 | Kelly et al. | |

FOREIGN PATENT DOCUMENTS

| | | | | |
|---|---|---|---|---|
| EP | 2401540 | B1 | 12/2016 | |
| GB | 1291208 | A * | 2/1970 | B21D 39/04 |
| JP | 2005291236 | A | 10/2005 | |
| JP | 2007290027 | A | 11/2007 | |
| WO | 2010097767 | A1 | 9/2010 | |
| WO | 2015173429 | A1 | 11/2015 | |
| WO | 2022121523 | A1 | 6/2022 | |

OTHER PUBLICATIONS

Haws et al., "High Strength Glass-Ceramic to Metal Seals", Monsanto Research Corporation, Dec. 1, 1986, 23 pp.

Staff et al., "Fabrication of a Glass-Ceramic-to-Metal Seal Between Ti-6Al-4V and a Strontium Boroaluminate Glass", vol. 13, No. 5, Int. J. Appl. Ceram. Technol., Sep. 2, 2016, pp. 956-965.

Extended Search Report from counterpart European Application No. 23186315.0 dated Jan. 5, 2024, 8 pp.

Response to Extended Search Report dated Jan. 5, 2024, from counterpart European Application No. 23186315.0 filed Feb. 2, 2024, 29 pp.

Notice of Intent to Grant and Text Intended to Grant from counterpart European Application No. 23186315.0 dated Dec. 17, 2024, 67 pp.

Response to Communication Pursuant to 71(3) EPC dated Dec. 17, 2024, from counterpart European Application No. 23186315.0, filed Mar. 12, 2025, 6 pp.

* cited by examiner

SEALING OF CERAMIC TO METALLIC TUBES WITH DIFFERENT CTE FOR HIGH TEMPERATURE REACTORS

GOVERNMENT INTEREST

This invention was made with Government support under 80MSFC21CA010 awarded by NASA. The Government has certain rights in the invention.

TECHNICAL FIELD

The present disclosure relates generally to high temperature reactor systems. In particular, the system may include at least two different types of pipes or tubes.

BACKGROUND

Tubes or pipes are used to transport fluids through high-temperature systems such as high temperature reactors. Some systems include different types of tubes, which may include different materials of construction. Joining different types of tubes may be challenging, since the different materials of construction may have different material properties.

SUMMARY

In general, the disclosure describes systems, such as high-temperature reactor systems, jet or rocket engines, or other similar high temperature systems which include at least two different types of tubes. The different types of tubes may have different coefficients of thermal expansion (CTE). As such, joining the different types of tubes may be difficult, as their tendency to expand and contract at different rates during temperature changes may lead to fluid leakage through gaps that form between sealing surfaces and/or cracked components. Disclosed herein is a joining assembly which allows tubes having different CTEs to be joined and cycled through time periods of relatively low temperature and relatively high temperature with reduced leaking or fracturing.

An assembly is disclosed which includes a first tube. The first tube includes a first end configured to receive a second tube. The second tube includes a first end which is configured to both slidably translate into the first end of the first tube and to receive an insert. The insert is configured to be disposed within a first portion of the second tube near the first end of the second tube. The first tube, the second tube, and the insert are configured to form a seal, and a coefficient of thermal expansion (CTE) of the first tube is similar to a CTE of the insert and different from a CTE of the second tube.

Techniques according to the present disclosure include joining a first tube and a second tube. Joining the first tube and the second tube includes slidably translating a first end of a second tube into a first end of the first tube. The technique also includes slidably translating an insert into position within a first portion of the second tube near the first end of the second tube. Slidably translating the insert into the second tube and the second tube into the first tube forms a seal. The coefficient of thermal expansion (CTE) of the first tube is similar to a CTE of the insert and different from a CTE of the second tube.

The details of one or more examples are set forth in the accompanying drawings and the description below, where like symbols indicate like elements. Other features, objects, and advantages will be apparent from the description and drawings, and from the claims.

DETAILED DESCRIPTION

High temperature reactors and other high temperature systems may include tubes for transporting fluids. Such systems may include at least two different types of tubes, such as, for example, a ceramic tube and a metal or metal alloy tube. Ceramic tubes may be used in high temperature systems because they have excellent thermal shock resistance due to a low coefficient of thermal expansion (CTE), the inherent material property that dictates the rate at which a material expands with increase in temperature. Metal or metal alloy tubes may be used on high temperature system for various reasons, including compatibility with low temperature plumbing, allowing for the use of bellow, or other sealing and flow requirements.

Ceramic tubes may have a low CTE, such as on the order of about 2-6 parts per million per degree Celsius (ppm/° C.), while metal or metal alloy tubes may have a higher CTE, such as on the order of 10-17 ppm/° C. Joining tubes with differing CTEs presents a problem in areas which are exposed to high temperatures and/or temperature swings, because the tubes expand and contract differently (e.g., different thermal displacements, different rates of expansion or contraction) in response to changes in temperature. The differing displacements and rates of expansion and contraction during temperature cycles may result in deleterious effects, such as cracked tubes or joint components, and/or gaps between sealing surfaces that allow leaks. Fittings, such as full couplings, half couplings, reducing couplings, compression couplings, and slip couplings, may not work in these applications, because the differing CTEs of the tubes may result in increased displacement between sealing surfaces that creates leaks, increased forces between tubes and/or fittings that creates cracks, increased stress built up in the tubes or fittings, especially after repeated thermal cycles, that creates material fatigue, or other problems associated with a change in forces at an interface between tubes and/or fittings. Some systems try to avoid or minimize the difficulty in joining tubes with different CTEs by using only one type of tube in areas of the system that are subject to high temperatures. However, this solution may use extra material and dedicate extra space, which may be at a premium, to piping systems, or require additional cooling.

Disclosed herein are assemblies, systems, and techniques for joining tubes that having different CTEs that may be space-efficient and/or robust. The disclosed joining assemblies may be useful in high temperature systems such as high temperature reactors (e.g., methane pyrolysis reactors), or other systems which operate in high-temperatures or pipe high-temperature fluids. In some examples, these systems may operate above about 315° C., such as above about 425° C. Joining systems according to the present disclosure may allow for joining tubes with different CTEs, such as ceramic tubes and metallic tubes, to be joined in these high-temperature areas, and allow for robust and reliable gas-tight (e.g., gas-tight or nearly gas-tight) sealing performance over a series of cycles between low and high temperatures. Polymeric or elastomeric sealing may not be an option in such high temperature systems, because the system may reach high temperature may be too high.

Joining assemblies according to the present disclosure are advantageous in high-temperature applications in aerospace, oil and gas, performance materials, and other industries. Ceramic pipes are being integrated into more industrial applications due to their high temperature capabilities, and transitioning ceramic pipes to metal or metal alloy pipes may be an advantageous enabling technology.

In some examples, joining assemblies according to the present disclosure may include a first tube, a second tube, and an insert. The first tube and the insert may be configured to limit radial expansion and contraction, respectively, of the second tube during thermal transients to seal the first tube against the second tube. The insert may be a short section of tube (i.e., a third tube) which has an aperture passing through it from a first end to a second opposite end. The first end of the second tube may be slidably translated into a first end of the first tube. In some examples, at least a part of a first portion of the second tube that is located near the first end of the second tube may be positioned within the first tube. An insert may then be positioned within the first portion of the second tube. The insert may fit into the inner diameter of a second tube such that intimate contact is made between the insert and the second tube. Similarly, the first end of the second tube may fit into the inner diameter or a first tube recess within the first tube such that intimate contact is made between the first tube and the second tube. Stated similarly, the outer perimeter of the insert may match the inner perimeter of the second tube, and the outer perimeter of the second tube may match the perimeter of the first tube Thus, a seal may be formed by the first tube, the second tube and the insert, which may be gas-tight and provide an elegant solution for joining tubes with different CTEs.

The assembly may be configured to operate within a range between a low temperature and a high temperature, which may correspond with on and off operational states of a high temperature reactor or an engine. In some examples, the assembly may be originally formed at the low temperature, for example room temperature. Alternatively, the assembly may be formed at the high temperature, or at an intermediate temperature between the estimated or expected high operating temperature and the low operating temperature. Accordingly, the dimensions of the tubes and inserts described herein may be configured for assembly at the low temperature, the high temperature, or an intermediate temperature. In some examples, assembling the assembly at an intermediate temperature may result in reduction of fatigue and beneficial stress behavior.

As discussed above, in some examples, the assembly may be formed by slidably translating the first end of the second tube into the first end of the first tube, and then slidably translating the insert into a first portion of the second tube near the first end of the first tube. As described herein, the first portion of the second tube may be considered near the first end of the second tube if the first portion is closer to the first end of the second tube than the first portion is to a second opposite end of the second tube. In some examples, the components may be slidably translated with minimal force required. However, in some examples, the outer perimeter of the insert may be slightly larger than the inner perimeter of the second tube in the first portion of the second tube, and force may be required to position the insert such that it is disposed within the first portion of the second tube. The force may be a manual force, such as pressing or hammering, or a force applied by one or more machines. The applied force may cause the second tube to mechanically deform around the insert, creating intimate contact and sealing the insert within the first end of the second tube. This process may be called swaging. In some examples, the insert may define an outer perimeter that is between about 0.0001 inches to about 0.001 inches larger than the inner perimeter of the first end of the second tube. In some examples, the first portion of the second tube may define a longer length than both the insert and the first tube recess, such that the first portion of the second tube defines a tail portion which axially beyond the first tube recess and the insert and less constricted with respect to expansion and contraction during temperature cycles. In some examples, the tail portion may provide increased sealing performance over a greater number of temperature cycles.

The first tube and the insert may be made of materials that have the same or similar CTEs. For example, the first tube and the insert may include a ceramic material. The second tube may have a different CTE than the first tube. For example, the second tube may include a metallic material such as a metal or metal alloy having a higher CTE than the material of the first tube and the insert. The portion of the second tube may thus be sandwiched between the first tube and the insert, and forced to move with the first tube and the insert as the first tube and the insert expand during heating periods and contract during cooling periods. As the assembly is cycled through different temperatures, the intimate contact necessary to seal fluids flowing through the assembly may be maintained. While it is considered that the first tube and an insert may include a metal or metal alloy and the second tube may include a ceramic material, it may be advantageous for the first tube and the insert to include a ceramic material and the second tube to include a metal or metal alloy, because metallic materials sandwiched between two ceramic bodies may be malleable and ductile enough to move with the first tube and the insert without cracking or causing cracks in the first tube or the insert.

In some examples, the joining assemblies may be configured to reduce or prevent plastic deformation at the sealing interface to remain gas-tight during continuous or intermittent temperature cycling. Parameters to ensure the assembly forms and holds a seal may include geometric factors (e.g., thickness, diameter, and other geometric ratios), material factors, (e.g., elastic modulus of the materials, yield stress of the materials, temperature dependence of the CTE of the materials), manufacturing parameters, (work hardening during sealing), and other factors that may affect displacement of surfaces or generation of stresses in the joining assemblies. Since the assembly is configured to contain fluids passing through the first and second tubes, tight machining tolerances may also be desirable. Tubes and inserts of the present disclosure may be manufactured using any suitable technique, including but not limited to subtractive processes such as machining or grinding, additive processes such as additive manufacturing, or mixtures or combinations thereof.

Although described herein primarily with respect to an example assembly joining a ceramic tube to a metal tube, it is considered that assemblies described herein may be useful for other material systems, including assemblies that join two tubes having the same or similar CTEs or that include two materials with different CTEs. For example, two metallic (e.g., metal or metal alloy) tubes could be joined using an assembly in accordance with the present disclosure. In some examples, the metallic tubes could be the same material, and thus have the same CTE. In some examples, the tubes may be constructed of two different types of metals, and thus have different CTEs.

In some examples, the joining assemblies described herein may be structurally configured for reduced displacement of and/or thermal forces generated by the second tube during expansion and/or contraction. The second tube may include a first portion at the first end of the second tube that defines a smaller circumferential outer perimeter than a second portion of the second tube. The first portion of the second tube may also be called a "thin-wall section." Inclusion of a thin wall section in the second tube may be advantageous, because the thinner walls of the second tube in the first portion may reduce thermal expansion displacements of the second tube, reducing stresses on the other components of the assembly and thus increasing useful life (e.g., extending the number of thermal cycles to failure). Furthermore, the second portion of the second tube including thicker walls than the first portion may provide structural strength and stiffness.

Figure 1:
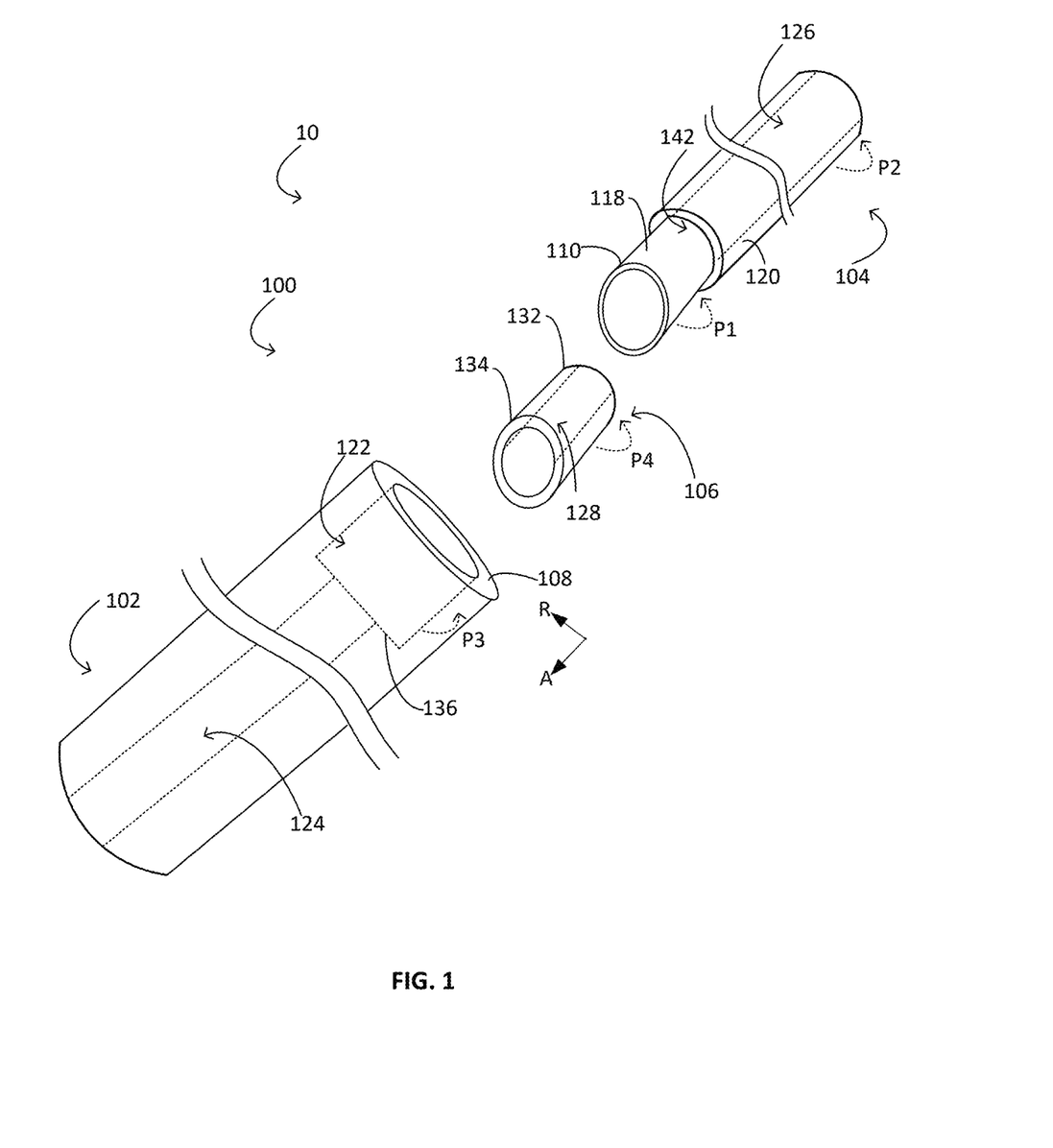
FIG. 1 is a conceptual perspective view illustrating an example first tube, second tube, and insert according to the present disclosure, with some internal features illustrated in broken lines.
Figure 2:
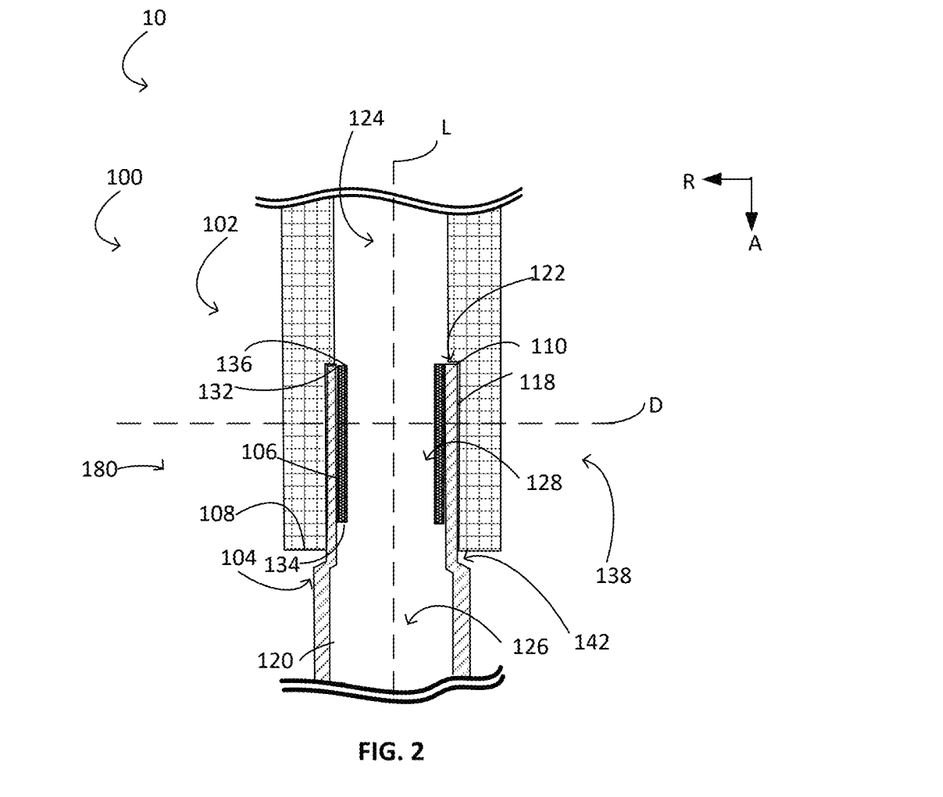
FIG. 2 is a conceptual cross-sectional view taken along a central axial axis, illustrating the example first tube, second tube, and insert of FIG. 1.
Figure 3:
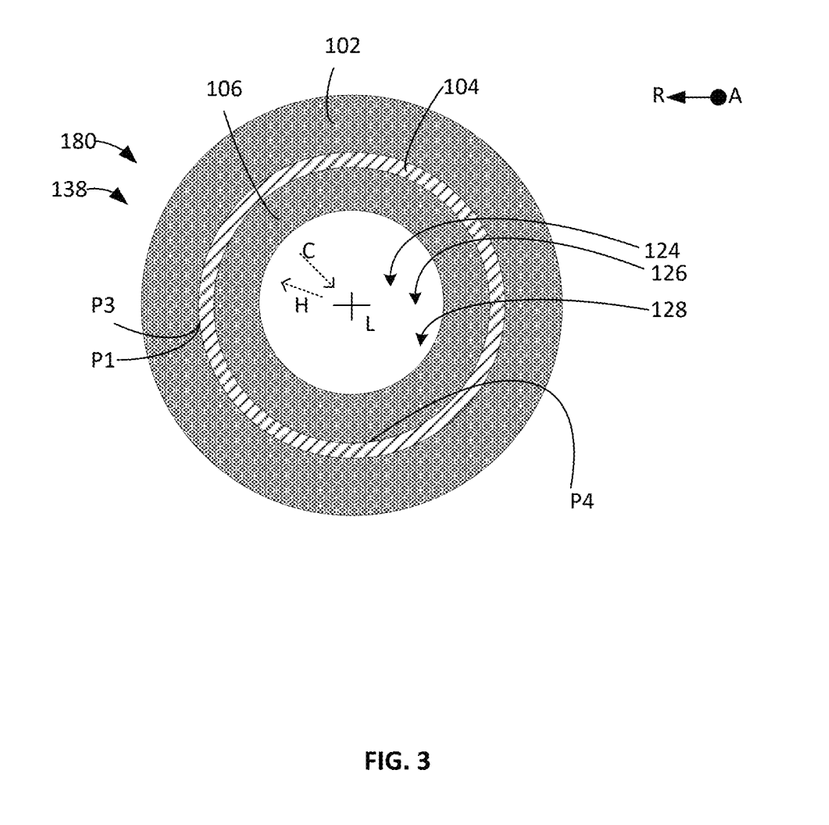
FIG. 3 is a conceptual cross-sectional view taken along a central axial axis, illustrating an example first tube, second tube, and insert according to the present disclosure.

FIGS. 1-3 illustrate example assembly 100 of system 10. FIG. 1 is a conceptual perspective view illustrating example system 10 which includes example assembly 100. Assembly 100 includes a first tube 102, a second tube 104, and an insert 106. Some internal features of first tube 102, second tube 104, and insert 106 are illustrated in broken lines. First tube 102, second tube 104, and insert 106 are illustrated in a disassembled state for clarity. FIG. 2 is a conceptual cross-sectional view taken along a central axial axis L extending in axial direction A, illustrating the example first tube 102, second tube 104, and insert 106 of FIG. 1 in an assembled state. FIG. 3 is a conceptual cross-sectional view taken along radial plane D extending along radial direction R of FIG. 2, illustrating an example assembly 100 of system 10.

With concurrent reference to FIGS. 1-3, assembly 100 includes first tube 102 and second tube 104. Each of first tube 102 and second tube 104 is configured to transport fluids within system 10 and constructed from materials suitable for containing fluids. In some examples, the fluids may be hot gases, which may be under pressure. First tube 102 defines central lumen 124 extending along an axial length of first tube 102 from first end of the first tube 108, such that fluids may be transported from any part of system 10, through first tube 102 and into second tube 104. Second tube 104 defines central lumen 126 extending axially along an axial length of second tube 102 from first end of second tube 110, such that fluids may be transported from any part of system 10, through second tube 104 and into first tube 102, or vice versa. Although illustrated as linear in axial direction A, in some examples first tube 102 and/or second tube 104 may be curved or include one or more segments disposed angularly from one another.

First tube 102, second tube 104, and insert 106 are configured to interface with each other to form a joint 138. First tube 102 includes first end 108 configured to receive second tube 104. Second tube 104 includes first end 110 configured to slidably translate into the first end of the first tube 108. Insert 106 is configured to be disposed within first portion 118 of second tube 104 to form seal 180 at joint 138.

While first tube 102 and second tube 104 may both be configured to contain gases, first tube 102 and second tube 104 may be formed from different materials. For example, first tube 102 may be configured to direct gases into a reactor or other high temperature system, while second tube 104 may be configured to interface with lower temperature tubing or include complex structures, such as bellows. As a result of these different materials, the CTE of second tube 104 may be different than the CTE of first tube 102. Additionally, first tube 102 and second tube 104 may contain gases that fluctuate in temperature based on the operating status and/or conditions of the high temperature system that result in temperature cycles.

First tube 102, second tube 104, and insert 106 are configured to form seal 180, which maintains intimate contact between first tube 102 and second tube 104 during these temperature cycles (e.g., an on/off cycle of a high temperature cycle). The coefficient of thermal expansion of first tube 102 is similar to the CTE of insert 106 and different from the CTE second tube 104. For example, the difference in the CTE of second tube 104 and first tube 102 may be greater than 5 ppm/° C. Assembly 100 may be a joining solution for tubes with CTE differences, because the geometric relationship between first tube 102, second tube 104, and insert may cause second tube 106 to thermally displace at the same rate as first tube 102 and insert 106 during a temperature change across system 10 or local to assembly 100, to maintain the location of second tube 104 between first tube 102 and insert 106. In some examples, the CTE of second tube 104 may be different than the CTE of insert 106, or different than both the CTE of first tube 102 and insert 106. In some examples, the CTE of second tube 104 may be greater than the CTE of first tube 102.

First tube 102 defines a first tube recess 122. First tube recess 122 is configured to receive and/or releasably secure first end of the second tube 110 against first tube recess surface 136, with first end of the second tube 110 fitting against first tube recess surface 136, such that at least part of first portion 118 of second tube 104 is disposed within first tube 102. First tube recess may be a void within first tube 102 that overlaps central lumen 124 and extends partially along the length of central lumen 124 in axial direction A, such that first tube recess surface 136 is defined at the end of first tube recess 122 opposite first end of the first tube 108. First tube recess is configured to receive second tube 104. First end of second tube 110 may be inserted into first tube 102 at first end of first tube 108 and slidably translated axially until first end of second tube 110 is in contact with first tube recess surface 136. First tube recess 122 defines first tube recess perimeter P3, as discussed elsewhere in the disclosure. Although first tube recess 122 is illustrated as cylindrical in shape with smooth walls, in some examples first tube recess 122 may include ridges, ribs, threads, and/or other complex features configured to further secure first end of second tube 110 against first tube recess surface 136.

Second tube 104 is configured to form the other half of joint 138 and to transport fluids about system 10. In some examples, second tube 104 may be a pipe defining a uniform inner diameter and outer diameter, and configured such that insert 106 may simply be slidably translated into first end of second tube 110 and remain in place by friction until insert 106 is positioned within first portion 118 of second tube 104.

Second tube 104 may include first portion 118 and second portion 120. First portion 118 begins at first end of the second tube 110 and extends axially along an axial length of second tube 104. In some examples, the axial length of first portion 118 corresponds to the axial length of first tube recess 122. Preferably, first portion 118 may define a longer axial length than the axial length defined by first tube recess portion 122 so that first end of second tube 110 may contact first tube recess surface 136 without interference by second portion 120 and tail portion 142 of first portion 118 is not housed within first tube recess 122. First portion 118 may also be called the "thin wall section," and may be an axial portion of the second tube comprising the first end of the second tube that defines outer perimeter P1. Second portion 120 may also be called the "thick wall section" of second tube 104, and may define outer perimeter P2. Inclusion of the thin wall section may reduce the stresses on first tube 102 and insert 106 in the area of joint 138, because the thin wall of second tube 104 in first portion 118 will not exert as much thermally-induced force during a change in temperature, and/or may reduce an amount of thermal displacement of second tube 104 in the area of joint 138, as the thickness of the thin wall may be relatively small compared to the thickness of first tube 102 and insert 106. Inclusion of the thick wall section in the area away from joint 138 may provide greater structural strength and stability, since the increased thermal displacement in these areas is not likely to cause other components of assembly 100 to stress and crack. Tail portion 142 of first portion 118 may be a length of the thin wall section that extends axially beyond first end 108 of first tube 102, and may relieve stresses on first portion 118 overall because it may expand and contract during temperature cycles without being sandwiched between first tube 102 and insert 106.

In some examples, first portion 118, insert 106, and first tube 102 may define a combined wall thickness. The ratio of the thickness of first tube 102 and insert 106 to the thickness of the first portion 118 may be between about 2:1 and about 200:1, such as for example about 10:1 to 100:1. In some examples, first portion 118 may define a wall thickness between the outer perimeter and central lumen 126 that may be between about 0.005 and about 0.030 inches. For example, the thickness of the wall of second tube 104 in first portion 118 may be between about 0.05 and about 0.010 inches, which may balance material stability and machinability against the greater thermal displacement forces exerted by thicker walls. Alternatively, as discussed above, second tube 104 may, in some examples, define a uniform outer perimeter along its entire axial length. Stated similarly, in some examples, P1 may be equal to P2.

As illustrated in FIGS. 1-3, first tube 102, second tube 104, and insert 106 may be cylindrical and thus define a circular outer perimeter and lumen cross-section. However, in some examples, another suitable geometric shape may be used for any or all of first tube 102, second tube 104, or insert 106, such that one or more of the perimeters or cross-sections is ovular, elliptical, rectilinear, curvilinear, or the like. Outer perimeter P1 of first portion 110 may match first tube recess perimeter P3, regardless of the shape of the perimeters. Similarly, outer perimeter P4 of insert 106 may be configured to match second tube central lumen 126 in first portion 118 of second tube 104.

Insert 106 is configured to stabilize joint 138 by providing an internal body that expands and contracts a similar amount and at a similar rate as first tube 102 as the temperature of system 10 varies, because insert 106 has a similar CTE as first tube 102. In some examples, first tube 102 and insert 106 may be made of the same material and thus have the same CTE. Alternatively, first tube 102 and insert 106 may be different materials, such as two different ceramic materials, that have slightly different CTEs relative to the difference between the CTEs of first tube 102 and second tube 104. For example, the difference between the CTE of first tube 102 and insert 106 may be less than or equal to 2 ppm/° C., such as less than or equal to 1 ppm/° C., thereby sandwiching second tube 104 and forcing second tube 104 to move in unison with first tube 102.

Insert 106 may define insert lumen 138 extending from insert first end 132 to insert second end 134. Accordingly, a fluid may pass through assembly 100 through central lumen 124 of first tube 102, through insert lumen 128, and through central lumen 126 of second tube 104, or vice versa in the other direction, while remaining sealed inside assembly 100, even at high temperature and/or pressure. As discussed above, insert 106 may be configured to be disposed within first portion 118 of second tube 104, and thus length of the insert between insert first end 132 and insert second end 134 may be less the the length defined by first portion 118 of second tube 104. Furthermore, in some examples, because swaging action may be desired inside first tube 102, such that seal 180 is formed within first tube recess 122, rather than at first end 108 of first tube 102, insert 106 may define a shorter axial length than first tube recess 122. Configured in this way, such that insert 106 defines a shorter axial length than first tube recess 122, may be desirable to reduce material stresses over multiple thermal cycles.

In some examples, first tube 102 and insert 106 may include a ceramic material. In the illustrated example, first tube 102 and insert 106 include ceramic material, and second tube 104 comprises a metal material. In some examples, the ceramic material may be selected from the group consisting of carbon, carbon-carbon composites, graphite, MACOR®, available from Corning, Inc. (Corning, NY, USA), silicon carbide, silicon carbide/silicon carbide composites, oxide/oxide composites, alumina, zirconia, silicon nitrides, other ceramics, or mixtures or combinations thereof.

In some examples, second tube 104 includes a metallic material. Metallic materials may include any suitable metal or metal alloy. Alternatively, in some examples, first tube 102 and insert 106 may include a metal material, and second tube 104 may also include a metal material. In some examples, the metal material of first tube 102 and insert 104 may have a lower CTE than the metal material of second tube 104. In examples where first tube 102 and/or insert 106 may include a low CTE metallic material, the low CTE metallic material may include a refractory metal. Suitable refractory metals include, but are not limited to, molybdenum, tungsten, niobium, tantalum, rhenium, or the like.

FIG. 3 includes arrows C and H, which illustrate the direction of forces on assembly 100 during periods of cooling and heating, respectively. In some examples, during periods of cooling, first tube 102 and insert 106 may contract toward axis L, the central axial axis of assembly 100, at same or a similar rate, because the CTE of first tube 102 and insert 106 are the same or similar. Arrow C illustrates the direction of contraction forces during a cooling period. Accordingly, during a cooling period, perimeters P3 and P4 may become less displaced from central axial axis L. Since second tube 104 is trapped between first tube 102 and insert 106 in the area of seal 180, perimeter P1 may become proportionally less displaced from central axial axis L during a period of cooling, maintaining the position of second tube 104 between first tube 102 and insert 106. In some examples, second tube 104 may have a higher CTE than first tube 102, and, in the absence of insert 106, perimeter P1 of second tube 104 would contract more than first tube 102 toward central axial axis L, potentially creating a gap for fluids to escape from assembly 100. However, insert 106, having the same or similar CTE as first tube 102, contracts during a period of cooling substantially the same amount as first tube 102 and at substantially the same rate as first tube 102. Therefore, insert 106 may prevent second tube 104 from contracting away from the wall of first tube 102, holding seal 180 substantially gas tight (e.g., gas tight or nearly gas tight) through the cooling period. The thin wall of first portion 118 (FIG. 1) of second tube 118 may maintain the contraction force exerted by second tube 104 on insert 106 below a threshold force which causes insert 106 to crack, because first portion 118 of second tube 104 contains less material than second portion 120 of second tube 106.

Similarly, arrow H illustrates the direction of expansion forces during periods of heating. Periods of increasing temperature may cause first tube 102, second tube 104, and insert 106 to expand according to the CTE of their material(s) of construction. In some examples, second tube 104 may have a higher CTE than first tube 102 and insert 106. First tube 102 and insert 106 may have the same or similar CTE. First tube 104 may prevent second tube 104 from expanding more than insert 106 during periods of heating, since first tube 102 may be configured to expand a similar amount to insert 106 and at a similar rate as insert 106. Accordingly seal 180 may be substantially gas tight through a heating period. The thin wall of first portion 118 (FIG. 1) of second tube 118 may maintain the contraction force exerted by second tube 104 on first tube 102 below a threshold force which would cause first tube 102 to crack, because first portion 118 of second tube 104 contains less material than second portion 120 of second tube 106.

A thermal cycle may include a heating period, where assembly 100 expands in a direction along arrow H in a direction away from central axial axis L, and a cooling period, where assembly 100 contracts in a direction along arrow C towards central axial axis L. Seal 180 at joint 138 may be configured to be substantially gas tight through a series of thermal cycles, because the expansion and contraction of tubes 102, 104 with different CTEs may be controlled through the physical relationship of tubes 102, 104, and insert 106.

Figure 4:
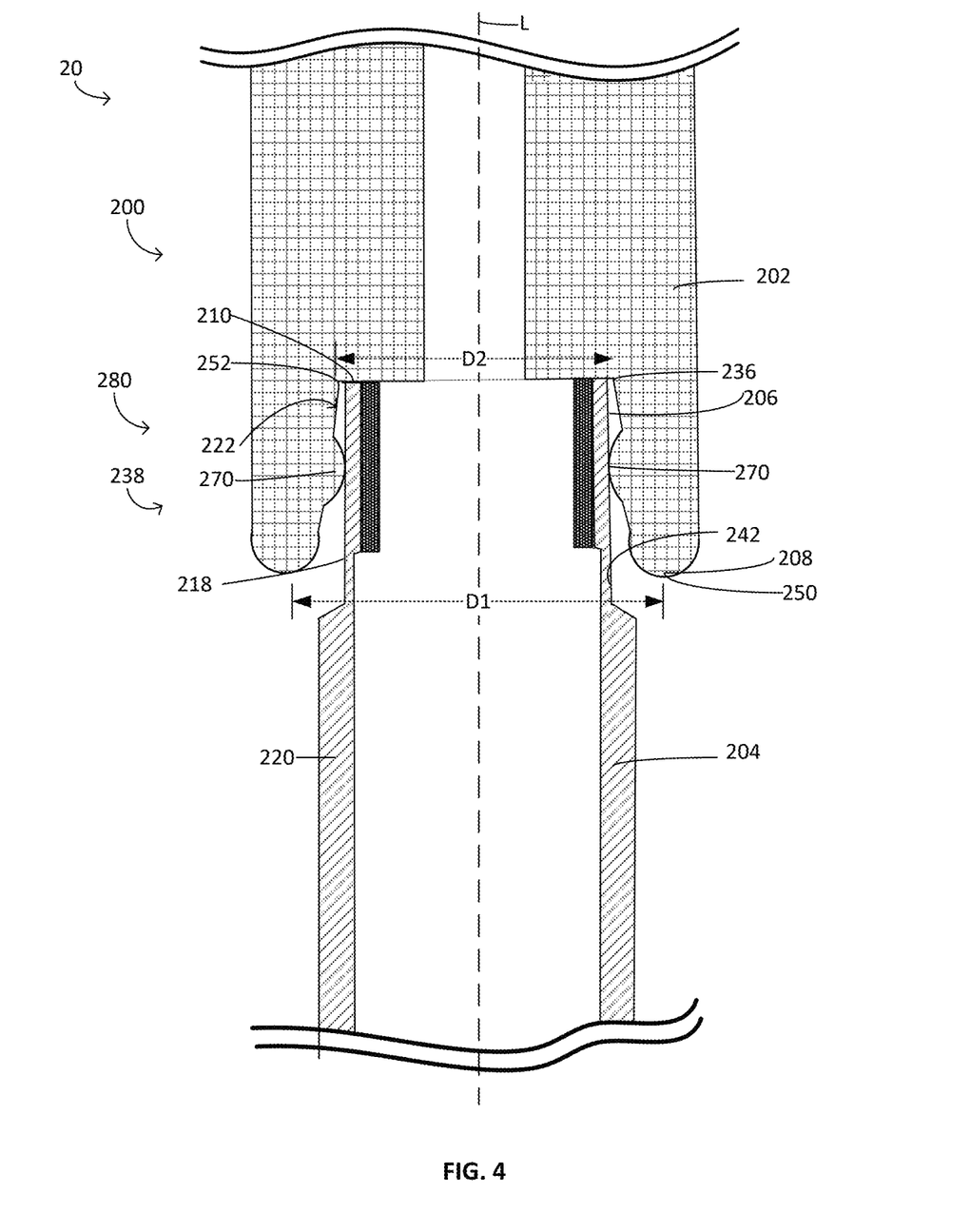
FIG. 4 is a conceptual cross-sectional view taken along a radial plane, illustrating an example first tube, second tube, and insert according to the present disclosure.

FIG. 4 is a conceptual cross-sectional view of assembly 200 of system 20, taken along a central axial axis, illustrating example first tube 202, second tube 204, and insert 206 according to the present disclosure in an assembled state. The angles illustrated may not be to scale, but rather exaggerated to illustrate the examples. Assembly 200 of FIG. 4 may be an example of assembly 100 of FIG. 1, corresponding to the illustration of FIG. 2, and differing as described below. Many elements similar to FIG. 2 are omitted for clarity.

In some examples, as illustrated, first tube recess 222 defines a first end 250 at the first end of the first tube 208 and a second opposite end 252 at first tube recess surface 236. In some examples, first tube recess 222 may define a non-uniform diameter D1, D2 in an axial direction. In some examples, diameter D1 at the first end 250 may be greater than second diameter D2 at the second opposite end. First tube recess 222 configured in this way may allow second tube 204 to more easily slidably translate to contact first tube recess surface 236, and may reduce material stresses in first tube 202 which may build up over a series of cycles and ultimately cause first tube 202 to crack or fracture. First tube 202, in this example, has rounded edges at first edge of first tube 208, which may assist in reducing material stresses. As assembled, first tube 202, second tube 204, and insert 206 form joint 238 which includes seal 280 preventing fluids from escaping assembly 200 when flowing between first tube 202 and second tube 204. In some examples, one or more ribs 270 may extend from the wall of first tube recess 222 toward central axis L to provide a sealing surface between first tube 202 and second tube 204. Alternatively, a rib or ribs may extend away from central axis L from the outer perimeter of first portion 218 of second tube 204 toward the wall of first tube recess 222 to provide a sealing surface. In some examples, second tube 204 or the wall of first tube recess 222 may define more than one ribs along the axial length of the part, and may thus provide more than one sealing surface for redundancy and/or improved sealing performance.

Figure 5:
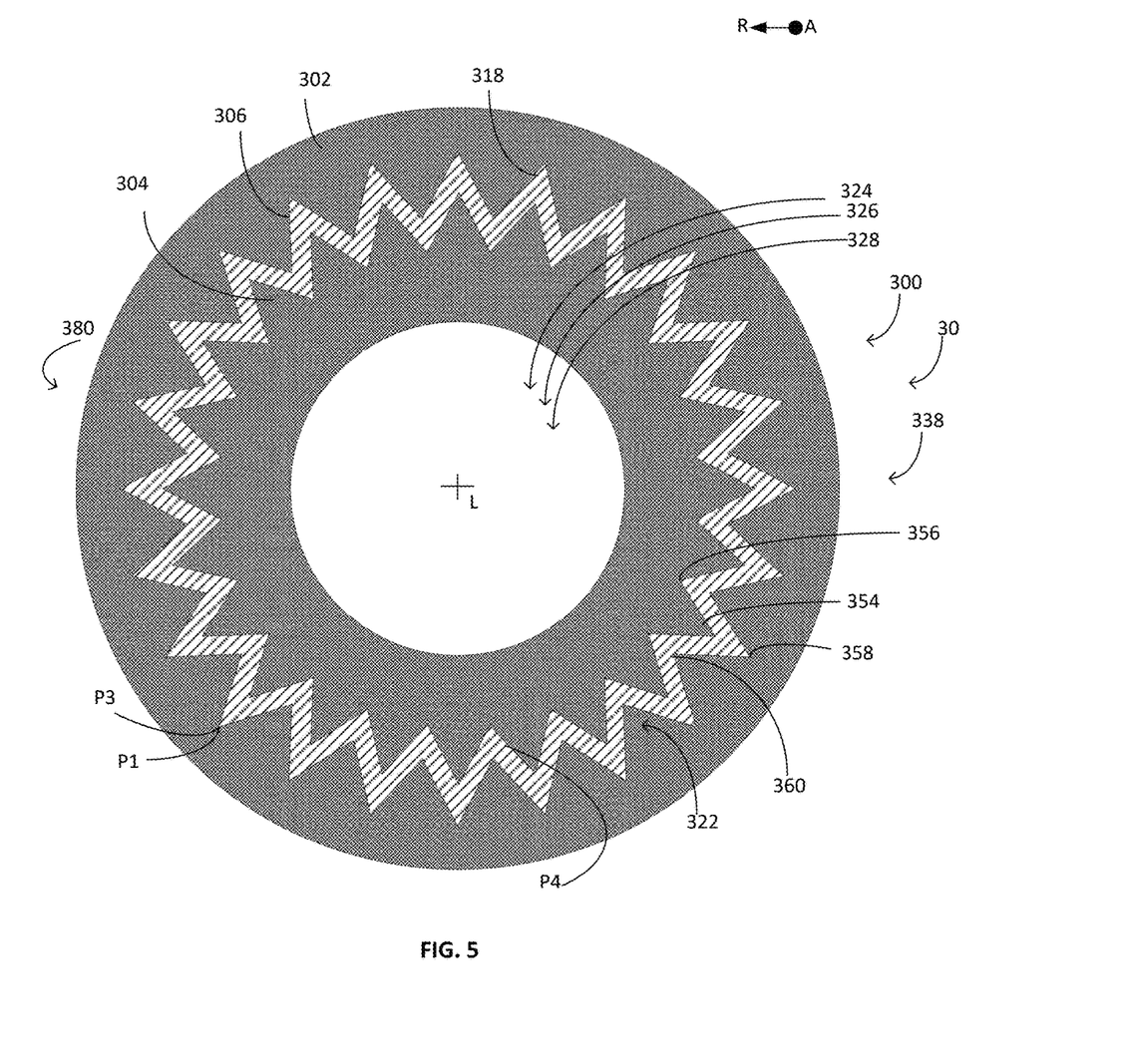
FIG. 5 is a conceptual cross-sectional view taken along a radial plane, illustrating an example first tube, second tube, and insert according to the present disclosure.

In some examples, first portion 218 of second tube 204 may define a smaller inner diameter than second portion 220 of second tube 204. Configured in this way, insert 206 may slide or fall easily through second tube 204 from the end opposite first end 210 to first portion 218, where insert 206 may then be forced (e.g., hammered) into position within first portion 218 such that insert 206 is disposed within first portion 218. Alternatively, the inner diameter defined by second tube 204 may define a substantially constant cross-section. In some examples, insert 206 may be configured to reach its position within first portion 218 from the other direction, through first tube 202, in examples where the inner diameter (central lumen 124, FIGS. 1-3) of first tube 202 is configured to allow insert 206 to slide within it by defining an inner diameter larger than the outer perimeter (P4, FIGS. 1-3) of FIG. 5 is a conceptual cross-sectional view of assembly 300 of system 30, taken along a radial plane, illustrating example first tube 302, second tube 304, and insert 306 according to the present disclosure. Assembly 200 of FIG. 4 may be an example of assembly 100 of FIG. 1, corresponding to the illustration of FIG. 2, and differing as described below. As discussed above with respect to FIG. 3, assembly 300 includes first tube 302, second tube 304, and insert 306. Lumens 324, 326, and 328 of first tube 302, second tube 304, and insert 306, respectively, define a channel for fluids to flow through assembly 300 (into the page or out of the page).

As discussed above, any of perimeters P1, P2, P3, or P4 may define any suitable shape. Insert 300 of assembly 300 defines a corrugated shape, which defines a series of ridges 354 which extend radially a greater distance than grooves 356 about central axis L. Outer perimeter P4 of insert 306 matches the inner diameter of second tube 304 such that perimeter P4 of insert 306 contacts the surface of the inner diameter of second tube 304. Second tube 304 defines out perimeter P1 in first portion 318, which is the part of the second tube near the first end of the second tube (110, FIG. 1) that is configured to slidably translate into first tube 302 to form seal 338. In some examples, perimeter P1 defines a corrugated shape. In some examples, outer perimeter P4 of insert 106 may define a corrugated shape, which may define a series of ridges 358 which extend radially a greater distance than grooves 360 about central axis L. Outer perimeter P1 of first portion 318 of second tube 304 may match the size and shape of perimeter P3 of first tube recess 322, such that there is contact between the walls of first tube recess 322 and first portion 318 of second tube 304.

Figure 6:
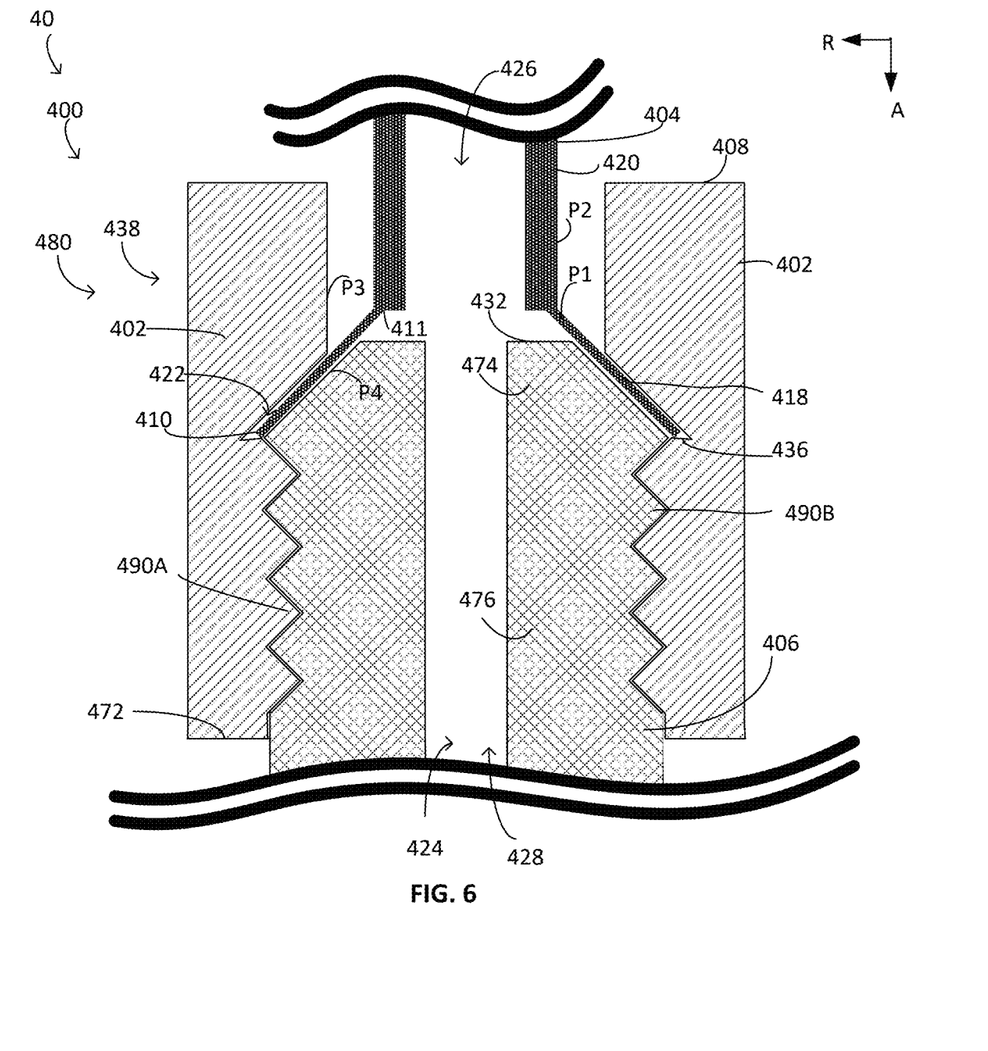
FIG. 6 is a conceptual cross-sectional view taken along a central axial axis, illustrating an example first tube, second tube, and insert according to the present disclosure.

FIG. 6 is a conceptual cross-sectional view of assembly 400 of system 40 taken along a central axial axis (L, FIG. 2), illustrating the example first tube 402, second tube 404, and insert 406. Assembly 400 may be generally described similarly to assembly 100 of FIGS. 1-3 as described above, where like symbols indicate similar elements. Assembly 400 differs from assembly 100 (FIGS. 1-3) as described below.

In some examples, first tube 402 may be a relatively short section of tube (e.g., a nut), that has an axial length extending from first end 408 to second end 472, which may not extend axially beyond a region near joint 438. Rather, insert 406 may extend axially away from joint 138, and may contain fluids to be transported to other parts of system 40.

First tube 402 defines first tube recess 422, which is configured to receive first end 410 of second tube 404. First tube recess 422 defined first tube recess surface 436. First tube central lumen 424 defines series of threads 490A on the radial inner surface of first tube 402.

Insert 406 includes first portion 474 which is configured to slidably translate into first end 410 of second tube 404, forming a mating surface between the components. Insert 406 also include second portion 476, which extends axially beyond first end 410 of second tube 404 when insert 406 is slidably translated into first end 410 of second tube 404. Outer perimeter P4 of insert 406 in second portion 476 may define a series of threads 490B along an axial length of insert 406. Threads 490A defined by first tube 402 and threads 490B defined by insert 406 are configured to mate to releasably secure first tube 402 to insert second portion 476.

First portion 418 of second tube 404 may extend from first end 410 to an opposite end 411 which interfaces with second portion 420 of second tube 404. In some examples, second portion may have a constant, uniform outer perimeter P2 along its axial length. First portion 418 defines outer perimeter P1, which may increase in magnitude in an axial direction from second end 411 of first portion 418 to first end 410. Stated similarly, first portion 118 may define a conical shape with the top section cut off. First portion 118, also called the thin wall portion, may define a varying outer perimeter P1 along an axial direction, which may be desirable for increasing the performance of assembly 400 across more temperature cycles. Additionally, assembly 400 may provide advantages in ease of disassembly and reassembly, since the assembly may include a threaded coupling formed when threads are mated. In some examples, first tube recess 422 of first tube 402 and insert 406 may be configured to match the shape of first portion 418 of second tube 402, such that seal 480 is formed at joint 438.

Figure 7:
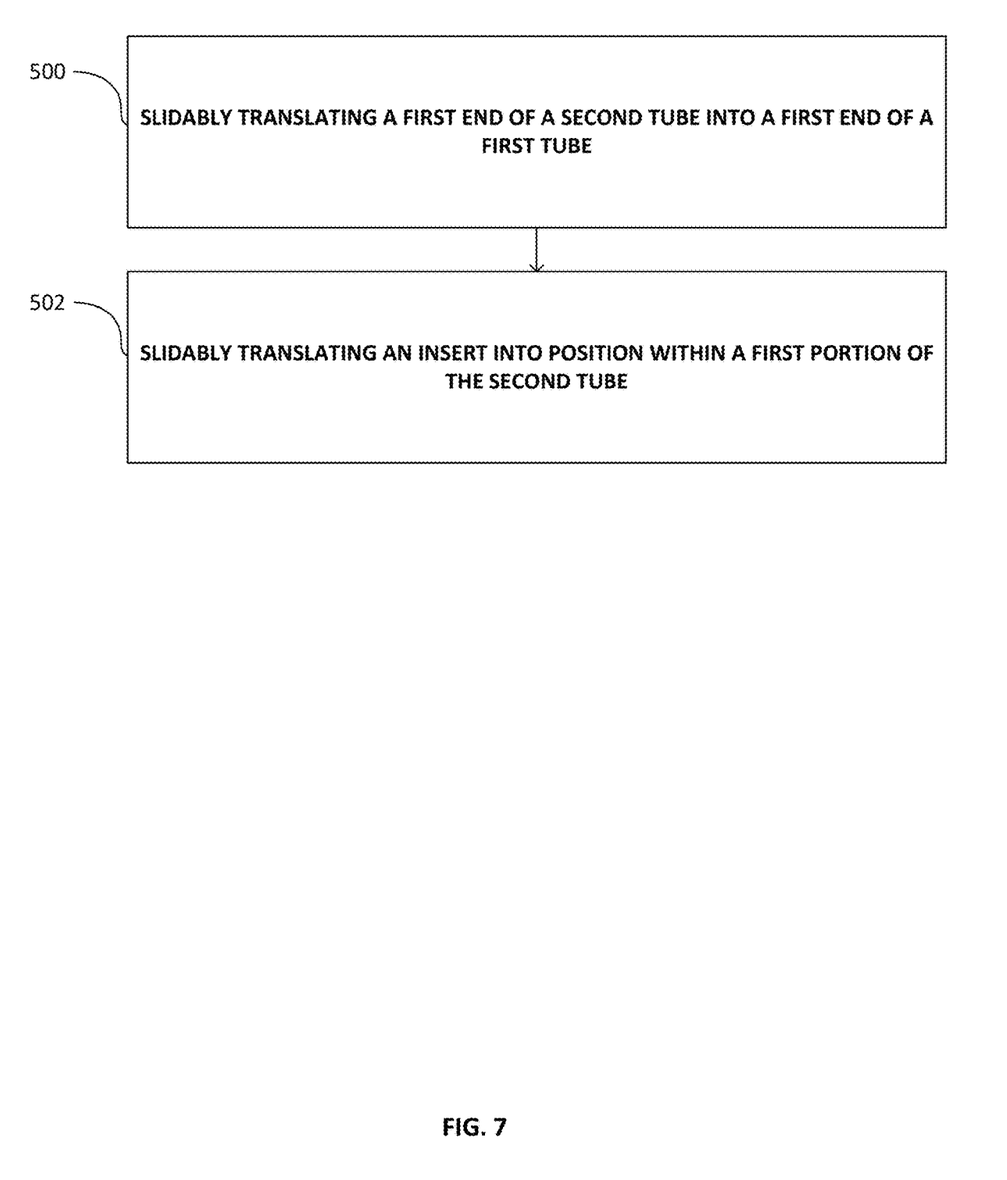
FIG. 7 is a flowchart illustrating an example technique according to the present disclosure.

FIG. 7 is a flowchart illustrating an example technique according to the present disclosure. Techniques according to the present disclosure may be used for joining a first tube and a second tube. Although described below primarily with respect to example assembly 100 of system 10 of FIGS. 1-3, other assemblies may be used to perform the described technique, and the described technique may be performed using another assembly. In some examples, the described technique may be used to join tubes 102, 104, to form assembly 100, that may be part of a larger system 10. In some examples, system 10 may be a high-temperature reactor.

Joining the first tube and the second tube may include slidably translating first end 110 of second tube 104 into first end 108 of first tube 102 (500). In some examples, first end 110 of second tube 110 may be slidably translated axially into first tube recess 122 until first end 110 of second tube 104 contacts first tube recess surface 136. In some examples, slidably translating first end 110 of second tube 104 into first end 108 of first tube 108 comprises slidably translating at least a part of first portion 118 of second tube 104, which may be near and/or include first end 110, into first end 108 of first tube 102. In some examples, tail portion 142 of first portion 118 may extend beyond recess 122 of first tube 102. In some examples, first portion 118 of second tube 104 may define a smaller circumferential outer perimeter P1 than the outer circumferential perimeter P2 of second portion 120 of second tube 104.

The technique also includes slidably translating insert 106 into position within first portion 118 of second tube 104 (502). In some examples, first portion 118 may be near first end 110 of second tube 104.

In some examples, steps 500 and 502 may occur in temporal order; first slidably translating second tube 104 into first tube 102, and then subsequently slidably translating insert 106 into position with first portion 118 of second tube 104. In some examples, slidably translating insert 106 into position may include hammering or otherwise applying force to insert 106 such that first portion 118 is mechanically deformed during positioning of insert 106. However, it is also considered that in some examples, insert 106 may first be positioned within second tube 104 before second tube 104 is slidable translated into first tube 102. In any case, first tube 102, second tube 104, and insert 106 may form seal 180 at joint 138, and may provide an elegant joint that is robust enough to withstand thermal cycling. In some examples, a coefficient of thermal expansion (CTE) of first tube 102 may be similar to a CTE of insert 106 and different from a CTE of second tube 104. In some examples, first tube 102 and insert 106 include a ceramic material. In some examples, second tube 104 includes a metal material. Insert 106 may define lumen 128 which may extend from first end 132 of insert 106 to second opposite end 134 of insert 106.

In some examples the CTE of first tube 102 may be lower than the CTE of second tube 104. Performing the described technique to seal tubes having CTEs with this relationship may form an assembly including seal 180, which in some examples may be gas-tight (e.g., gas-tight or nearly gas-tight). In some examples, the CTE of first tube 102 may be the same (e.g., the same or nearly the same) as the CTE of insert 106. In some examples, a magnitude of the difference between the CTE of first tube 102 and the CTE of second tube 104 may be at least 5 parts per million per degree Celsius (ppm/° C.).

In some examples, slidably translating first end 110 of second tube 104 into first end 108 of first tube 102 may include slidably translating first end 110 of second tube 104 into first tube recess 122 defined by first tube 102. In some examples, first tube recess 122 may define first tube recess perimeter P3. First tube recess perimeter P3 may, in some examples, matches outer perimeter P1 of second tube 104. In some examples, first tube recess 122 may be cylindrical, or may alternatively define another geometric shape. For example, with reference to FIG. 5, outer perimeter P1 of second tube 304 may define a corrugated shape with a series of ridges 358 and grooves 360. Insert 306 may define outer perimeter P4, and outer perimeter P4 of insert 106 may define a corrugated shape.

Referring to FIG. 4, in some examples, first tube recess 122 may define a first end at first end 108 of first tube 102 and a second opposite end at first tube recess surface 136. First tube recess 122 may define a non-uniform diameter in an axial direction A, and the diameter may be larger at the first end 208 of the first tube recess 222 (D2) than at the opposite end (D1) of first tube recess 222.

EXAMPLES

Example 1

A seal assembly in accordance with the present disclosure was constructed and tested. Graphite was the ceramic material used to make the first tube and the insert, and Inconel 625 was used to make the second tube. The difference between the CTEs of the ceramic graphite and the metallic Inconel 625 was about 5 ppm/° C. The assembly was thermally cycled under a thermal gradient by exposing a heat source approximately 12 inches away from the joint along the first tube in the axial direction. The heat source was at a temperature of 1200° C. Thermal cycling under a thermal gradient was conducted. During the heating periods, the assembly reached a temperature of 700° C. at the joint, as measured by a thermocouple placed near the seal on the outer surface of the first tube. The joint showed successful sealing and no damage after several cycles of heating and cooling down.

Example 2

A seal assembly in accordance with the present disclosure was constructed and tested. MACOR® was the ceramic material used to make the first tube and the insert, and stainless steel alloy 316 was used to make the second tube. The difference between the CTEs of the ceramic MACOR® and the metallic stainless steel alloy is about 6 ppm/° C. The assembly was thermally cycled by placing the assembly in an oven at a temperature 343° C. for 10 minutes, followed by 10 minutes at room temperature. After 150 cycles, hermeticity testing was conducted during which pressurized gas was contained within the assembly at 5 psi. The joint showed successful sealing and no damage after 150 cycles of heating and cooling down.

The following clauses illustrate example subject matter described herein.

Clause 1: An assembly includes a first tube; a second tube, wherein a first end of the second tube is configured to slidably translate into a first end of the first tube; and an insert configured to be disposed within a first portion of the second tube, wherein the first portion of the second tube is near the first end of the second tube, wherein the first tube, the second tube, and the insert are configured to form a seal, and wherein a coefficient of thermal expansion (CTE) of the first tube is substantially similar to a CTE of the insert and substantially different from a CTE of the second tube.

Clause 2: The assembly of clause 1, wherein the first tube and the insert comprise a ceramic material, and wherein the second tube comprises a metallic material.

Clause 3: The assembly of any of clauses 1 or 2, wherein the insert defines a lumen from a first end of the insert to a second opposite end of the insert.

Clause 4: The assembly of any of clauses 1-3, wherein a first portion of the second tube comprising the first end of the second tube defines a smaller circumferential outer perimeter than a second portion of the second tube.

Clause 5: The assembly of any of clauses 1-4, wherein the assembly is part of a high-temperature reactor.

Clause 6: The assembly of any of clauses 1-5, wherein the CTE of the first tube is lower than the CTE of the second tube.

Clause 7: The assembly of any of clauses 1-6, wherein the seal is gas-tight.

Clause 8: The assembly of any of clauses 1-7, wherein the CTE of the first tube is the same as the CTE of the insert.

Clause 9: The assembly of any of clauses 1-8, wherein a magnitude of the difference between the CTE of the first tube and the CTE of the second tube is at least about 5 parts per million per degree Celsius (ppm/° C.).

Clause 10: The assembly of any of clauses 1-9, wherein a magnitude of the difference between the CTE of the first tube and the CTE of the insert is less than about 1 ppm/° C.

Clause 11: The assembly of any of clauses 1-10, wherein the first tube defines a first tube recess configured to receive the second tube.

Clause 12: The assembly of clause 11, wherein the first tube recess defines a first tube recess perimeter, and the first tube recess perimeter matches an outer perimeter of the second tube.

Clause 13: The assembly of clause 12, wherein the first tube recess is cylindrical.

Clause 14: The assembly of clause 11, wherein the first tube recess defines a first end at the first end of the first tube and a second opposite end, and wherein the first tube recess defines a non-uniform diameter in an axial direction, and the diameter is larger at the first end of the first tube recess than at the opposite end of the first tube recess.

Clause 15: The assembly of clause 11, wherein the outer perimeter of the second tube defines a corrugated shape.

Clause 16: The assembly of clause 15, wherein the insert defines an outer perimeter, and the outer perimeter of the insert defines a corrugated shape.

Clause 17: A method includes joining a first tube and a second tube, wherein joining the first tube and the second tube comprises: slidably translating a first end of a second tube into a first end of the first tube, slidably translating an insert into position within a first portion of the second tube near the first end of the second tube; and wherein slidably translating the second tube into the first tube and the insert into the second tube forms a seal, and wherein a coefficient of thermal expansion (CTE) of the first tube is substantially similar to a CTE of the insert and substantially different from a CTE of the second tube.

Clause 18: The method of clause 17, wherein the first tube and the insert comprise a ceramic material, and wherein the second tube comprises a metallic material.

Clause 19: The method of any of clauses 17 or 18, wherein the insert defines a lumen from a first end of the insert to a second opposite end of the insert.

Clause 20: The method of any of clauses 17-19, wherein slidably translating the first end of the second tube into the first end of the first tube comprises slidably translating the first portion of the second tube comprising the first end of the second tube into the first tube, wherein the first portion of the second tube defines a smaller circumferential outer perimeter than a second portion of the second tube.

Clause 21: The method of any of clauses 17-20, wherein the assembly is part of a high-temperature reactor.

Clause 22: The method of any of clauses 17-21, wherein the CTE of the first tube is lower than the CTE of the second tube.

Clause 23: The method of any of any of clauses 17-22, wherein forming a seal between the first tube, the second tube, and the insert comprises forming a gas-tight seal.

Clause 24: The method of any of clauses 17-23, wherein the CTE of the first tube is the same as the CTE of the insert.

Clause 25: The method of any of clauses 17-24, wherein a magnitude of the difference between the CTE of the first tube and the CTE of the second tube is at least 5 parts per million per degree Celsius (ppm/° C.).

Clause 26: The method of any of clauses 17-25, wherein the slidably translating the first end of the second tube into the first end of the first tube comprises slidably translating the first end of the first tube into a first tube recess defined by the first tube.

Clause 27: The method of clause 26, wherein the first tube recess defines a recess perimeter, and the recess perimeter matches an outer perimeter of the second tube.

Clause 28: The method of clause 26, wherein the first tube recess is cylindrical.

Clause 29: The method of clause 27, wherein the first tube recess defines a first end at the first end of the first tube and a second opposite end, and wherein the first tube recess defines a non-uniform diameter in an axial direction, and the diameter is larger at the first end of the first tube recess than at the opposite end of the first tube recess.

Clause 30: The method of clause 26, wherein the outer perimeter of the second tube defines a corrugated shape.

Clause 31: The method of clause 30, wherein the insert defines an outer perimeter, and the outer perimeter of the insert defines a corrugated shape.

What is claimed is:

1. An assembly comprising:
   a first tube;
   a second tube, wherein a first end of the second tube is slidably translatable into a first end of the first tube; and
   an insert completely disposed within a first portion of the second tube, wherein the first portion of the second tube is near the first end of the second tube,
   wherein the first tube, the second tube, and the insert are configured to form a seal,
   wherein the insert defines a lumen from a first end of the insert to a second opposite end of the insert, the insert defining an insert length between the first end and the second opposite end being less than a first portion length defined by the first portion of the second tube,
   wherein a coefficient of thermal expansion (CTE) of the first tube is substantially similar to a CTE of the insert and substantially different from a CTE of the second tube,
   wherein the first tube and the insert comprise a ceramic material,
   wherein the second tube comprises a metallic material, and
   wherein the CTE of the first tube is lower than the CTE of the second tube.

2. The assembly of claim 1, wherein the first portion of the second tube comprising the first end of the second tube defines a smaller circumferential outer perimeter than a second portion of the second tube.

3. The assembly of claim 1, wherein the assembly is part of a high-temperature reactor.

4. The assembly of claim 1, wherein the seal is gas-tight.

5. The assembly of claim 1, wherein the CTE of the first tube is the same as the CTE of the insert.

6. The assembly of claim 1, wherein a magnitude of a difference between the CTE of the first tube and the CTE of the second tube is at least about 5 parts per million per degree Celsius (ppm/° C.).

7. The assembly of claim 1, wherein a magnitude of the difference between the CTE of the first tube and the CTE of the insert is less than about 1 ppm/° C.

8. The assembly of claim 1, wherein the first tube defines a first tube recess configured to receive the second tube.

9. The assembly of claim 8,
   wherein the first tube recess defines a first tube recess perimeter, and
   wherein the first tube recess perimeter matches an outer perimeter of the second tube.

10. The assembly of claim 9, wherein the first tube recess is cylindrical.

11. The assembly of claim 8,
    wherein the first tube recess defines a first end at the first end of the first tube and a second opposite end, and
    wherein the first tube recess defines a non-uniform diameter in an axial direction, and the non-uniform diameter is larger at the first end of the first tube recess than at the opposite end of the first tube recess.

12. The assembly of claim 9, wherein the outer perimeter of the second tube defines a corrugated shape.

13. The assembly of claim 1, wherein a ratio of thickness of the first tube and insert to a thickness of the first portion of the second tube is between 10:1 to 100:1.

14. The assembly of claim 1, wherein the first portion of the second tube defines a thickness of between 0.05 inches and 0.010 inches.

15. A method comprising:
    joining a first tube and a second tube, wherein joining the first tube and the second tube comprises:
        slidably translating a first end of a second tube into a first end of the first tube,
        slidably translating an insert into position completely within a first portion of the second tube near the first end of the second tube; and
    wherein slidably translating the second tube into the first tube and the insert into the second tube forms a seal, and
    wherein a coefficient of thermal expansion (CTE) of the first tube is substantially similar to a CTE of the insert and substantially different from a CTE of the second tube,
    wherein the insert defines a lumen from a first end of the insert to a second opposite end of the insert, the insert defining an insert length between the first end and the second opposite end being less than first portion length defined by the first portion of the second tube,
    wherein the first tube and the insert comprise a ceramic material,
    wherein the second tube comprises a metallic material, and
    wherein the CTE of the first tube is lower than the CTE of the second tube.

16. The method of claim 15,
    wherein slidably translating the first end of the second tube into the first end of the first tube comprises slidably translating the first portion of the second tube comprising the first end of the second tube into the first tube, and
    wherein the first portion of the second tube defines a smaller circumferential outer perimeter than a second portion of the second tube.

* * * * *